US005779058A

United States Patent [19]

Satake et al.

[11] Patent Number: 5,779,058

[45] Date of Patent: Jul. 14, 1998

[54] COLOR SORTING APPARATUS FOR GRAINS

[75] Inventors: Satoru Satake, Tokyo; Takafumi Ito; Norimasa Ikeda, both of Hiroshima, all of Japan

[73] Assignee: Satake Corporation, Tokyo, Japan

[21] Appl. No.: 580,528

[22] Filed: Dec. 28, 1995

[30] Foreign Application Priority Data

| | | | |
|---|---|---|---|
| Dec. 28, 1994 | [JP] | Japan | 6-339845 |
| Jan. 12, 1995 | [JP] | Japan | 7-021161 |

[51] Int. Cl.[6] .................... B07C 5/342; G01J 3/50

[52] U.S. Cl. .................... 209/581; 209/587; 209/639; 209/938; 250/226; 356/425

[58] Field of Search .................... 209/576, 577, 209/580, 581, 582, 587, 638, 639, 938; 250/226; 356/407, 425

[56] References Cited

U.S. PATENT DOCUMENTS

| | | | |
|---|---|---|---|
| 3,873,181 | 3/1975 | Chivian et al. | 209/577 X |
| 5,135,114 | 8/1992 | Satake et al. | 209/587 X |
| 5,265,732 | 11/1993 | Long | 209/580 |
| 5,508,512 | 4/1996 | Gray et al. | 209/580 X |
| 5,538,142 | 7/1996 | Davis et al. | 209/580 |

FOREIGN PATENT DOCUMENTS

| | | | |
|---|---|---|---|
| 5200365 | 8/1993 | Japan | 209/587 |
| 655145 | 3/1994 | Japan | 209/580 |

*Primary Examiner*—Joseph E. Valenza
*Assistant Examiner*—Tuan N. Nguyen
*Attorney, Agent, or Firm*—Fish & Richardson P.C.

[57] ABSTRACT

The color sorting apparatus includes a grain guide device, a grain feeder, an illumination device for illuminating the grain, an optical detector consisting of an optical detection section for receiving the light from the illuminated grain and a background, and ejector for rejecting the grain. The illumination device employs at least one light source having spectral energy distribution in both the visible light region and the near infrared region. At least one set of the optical detection device for monitoring a predetermined detection field is provided. The optical detection section of the optical detection device includes a first light receiving sensor having high sensitivity to the visible light region and a second light receiving sensor having high sensitivity to the near infrared region. The single color sorting apparatus is capable of sorting and rejecting not only foreign materials with color different from that of the acceptable products in the visible light region but also foreign materials with the same color as the acceptable product or transparency in the near infrared region.

3 Claims, 6 Drawing Sheets

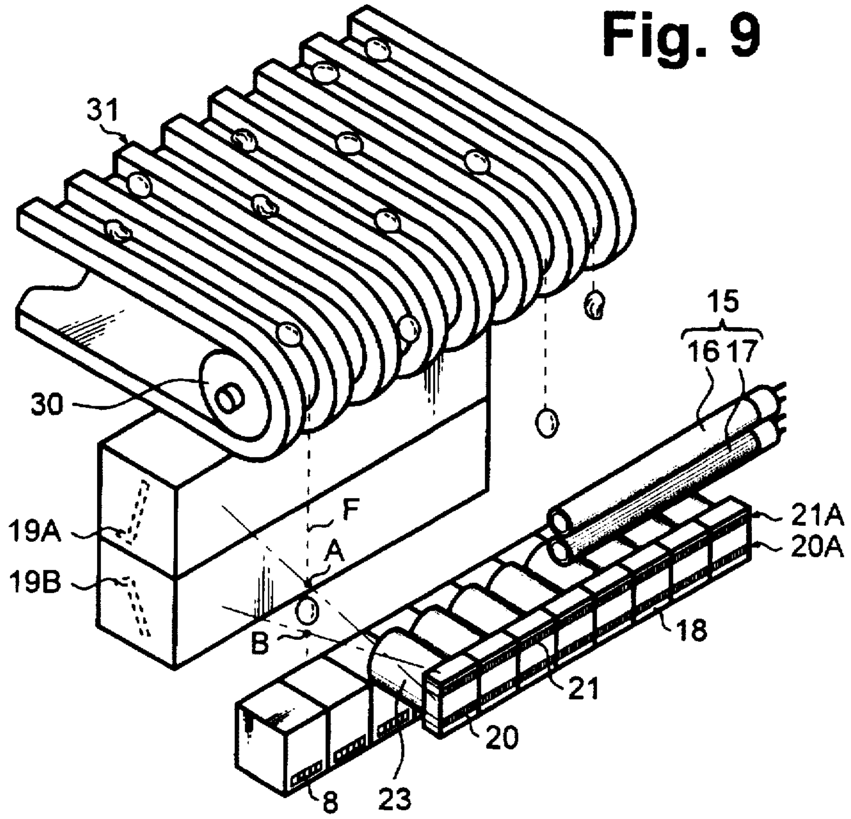
Fig. 9
Fig. 10
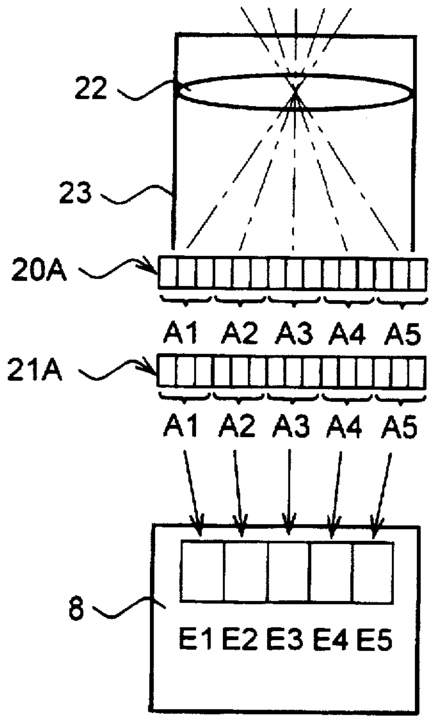

COLOR SORTING APPARATUS FOR GRAINS

BACKGROUND OF THE INVENTION (1) Field of the Invention

The present invention relates to a color sorting apparatus, and more particularly to a grain color sorting apparatus for sorting and rejecting foreign materials or rejective products which have been mixed in grains, beans or the like, using optical means.

(2) Description of the Related Art

A conventional color sorting apparatus as disclosed in, for example, Japanese Patent Application Kokai Publication No. Hei 1-258781, irradiates a grain in the visible light region with a light source using an incandescent lamp or a fluorescent tube, divides difference between the amount of light from the grain obtained by irradiating it with the light source and that obtained from a reference color plate into a plurality of wavelength bands, detects the respective bands with light receiving elements, and sorts and rejects foreign materials utilizing difference of color between acceptable products and foreign materials. However, such conventional color sorting apparatus cannot efficiently and surely sort and reject foreign materials with color similar to the acceptable products or transparency such as pieces of glass, plastics, metal, porcelain or china mixed in grain, beans or the like.

Then, Japanese Patent Application Kokai Publication No. Hei 5-200365 discloses a foreign material detector device which irradiates near infrared rays onto a test region, senses two rays with specific wavelength of the rays diffused by and transmitted through an object to be tested, respectively, and compares the two sensed values with predetermined values to determine whether the tested object is a subject object or a foreign material, whereby foreign material with color similar to the acceptable products or transparency can be detected.

However, when the foreign material detector device using near infrared rays as the light source is used, it is necessary to install the conventional color sorting device utilizing the visible light as the light source together. First, ordinary foreign materials with color different from the acceptable products are sorted and rejected in the visible light region by the conventional color sorting device. Subsequently, foreign materials with color similar to the acceptable products or transparency are sorted and rejected by the foreign material detector device utilizing near infrared rays. Unless such procedure is taken, effective sorting cannot be attained. In addition, incorporating the foreign material detector device utilizing near infrared rays into the conventional color sorting device utilizing visible light region increases the complexity, the size of the entire system, and causes the maintenance time.

SUMMARY OF THE INVENTION

In view of the above problems existing in the conventional color sorting apparatus, the primary object of the present invention is to provide a grain color sorting apparatus which is capable of, with a single unit, sorting and rejecting foreign materials with color different from acceptable products in the visible light region, and sorting and rejecting foreign materials with color similar to the acceptable products or transparency such as pieces of glass, plastics or the like in the near infrared region.

According to one aspect of the present invention, there is provided a grain color sorting apparatus comprising:

grain guide means for guiding grain along a predetermined grain path, grain feeding means for feeding grain to the grain guide means, illumination means for irradiating the grain in a predetermined detection field while the grain flows down along the grain path, optical detection means consisting of an optical detection section for receiving light from the irradiated grain and a background disposed at a location opposite to the optical detection section with the grain path intervened therebetween, a control circuit for outputting a rejection signal by comparing an output signal of the optical detection means with a threshold value, and ejector means disposed below the optical detection means and arranged for rejecting rejective grain or foreign materials according to the rejection signal from the control circuit, wherein the illumination means employs a single light source or a plurality of light sources with spectral energy distribution in the visible light region and the near infrared region, at least a set of the optical detection section for detecting a predetermined detection field and the background is provided, the optical detection section being composed of a light receiving sensor with high sensitivity to the visible light region and a light receiving sensor with high sensitivity to the near infrared region.

It is preferable to provide a dichroic mirror in the optical detection section of the optical detection means, the dichroic mirror dividing the reflected light obtained by irradiating the grain falling through the detection field with the rays from the light source into a component with a longer wavelength and a component with a shorter wavelength.

In addition, it is preferable that the optical detection section is provided with a plurality of light receiving sensors with high sensitivity to the visible light region and a plurality of light receiving sensors with high sensitivity to the near infrared region in respective rows, the respective light receiving sensors in the rows being integrally formed by vertically arranging them in parallel.

Furthermore, the optical detection means is more effective where a plurality of ejector means are provided in rows in correspondence to the light receiving sensors in rows.

Still further, the control circuit preferably comprises a speed detection circuit and a drive delay time change circuit, the speed detection circuit detecting flowing speed of the grain when it passes through the light receiving position of the light receiving sensor with high sensitivity to the visible light region and the light receiving position of the light receiving sensor with high sensitivity to the near infrared region by receiving sensing signals from both the light receiving sensors, the drive delay time change circuit changing drive delay time of the ejector means when there occurred a change in the flowing speed of the grain detected by the speed detection circuit.

Still more, the grain guide means may be a plurality of chutes disposed with inclination or a conveyor belt extending between a pair of rollers.

Particles to be sorted conveyed by the grain guide means are fed to the detection field along a predetermined path.

The particles to be sorted fed to the detection field are illuminated by, for example, illumination means having the visible light region and the near infrared region and consisting of a fluorescent tube and a halogen lamp. The reflected light from the particles to be sorted illuminated by the fluorescent tube is received by the light receiving sensor with high sensitivity to the visible light region in the optical detection section, while the reflected light from the particles to be sorted illuminated by the halogen lamp is received by the light receiving sensor with high sensitivity to the near infrared region in the optical detection section. Each light receiving sensor also receives the light from the background opposite to respective light receiving sensor.

Here, when a threshold value is determined for the amount of reflected light from the background opposite to the optical detection section to match the amount of light from desired acceptable products (such as, polished rice), a signal for rejecting different colored particles or foreign materials is output. In other words, there arises no change in the received light signal of the light receiving sensor if the acceptable products pass through the detection field, while there arises a change in the received light signal of the light receiving sensor if the particles with color different from the acceptable products or the foreign materials pass through the detection field so that, in response to such signal, a rejection signal is output through the control circuit.

Even if there is no change in the received light signal of the light receiving sensor with high sensitivity to the visible light region, there is a possibility that the grains passing through the detection field may contain foreign materials with the same color as the acceptable products or transparency such as pieces of glass, plastics, metal, porcelain or china which are mixed with the acceptable products and flow down together with them. Sorting of foreign materials by the present apparatus utilizes characteristics such that the acceptable products (polished rice) absorb the near infrared rays and provide less amount of reflected light, while foreign materials such as pieces of glass, plastics, metal, or china do not absorb the near infrared ray and provide more amount of reflected light. For example, FIG. 4 is a graph showing the amount of reflected light characteristics in the near infrared region of the acceptable products (polished rice), pieces of glass, pieces of plastics, and a white stone. In this example, it is found that the polished rice has a low reflectance in a wavelength region near 1400–1600 nm, while the pieces of glass, pieces of plastics and a white stone have a higher reflectance.

When there arises no change in the received light signal of the light receiving sensor with high sensitivity to the visible light region, the light receiving sensor with high sensitivity to the near infrared region does not cause a change in the received light signal even if the acceptable products (polished rice) pass through the detection field, while, if foreign materials with the same color as the acceptable products or transparency pass through the detection field, it causes a change in the received light signal because of the amount of reflected light characteristics. Then, such change in the received light signal generates the rejection signal through the control circuit.

When the control circuit outputs the rejection signal, the ejector means for guiding the different colored particles, foreign materials, and foreign materials with the same color as the acceptable products or transparency to a different path is actuated to sort and reject such foreign materials. The acceptable products (polished rice) which do not cause a change in the received light signals of both the light receiving sensors even if they pass through the detection field are transferred to a trough for receiving the grain or the like and suitably discharged as good products by conveyor means.

In particular, when the dichroic mirror is provided in the optical detection section, the amount of reflected light obtained by irradiating the rays from the light source onto the grain flowing down through the detection field is divided into a longer wavelength component and a shorter wavelength component. Then, the reflected light with the longer wavelength component transmits through the dichroic mirror and is received by the light receiving sensor with high sensitivity to the near infrared region, and the reflected light with the shorter wavelength component is reflected by the dichroic mirror and received by the light receiving sensor with high sensitivity to the visible light region.

BRIEF DESCRIPTION OF THE DRAWINGS

The above and other objects, features and advantages of the present invention will be apparent from the following description of preferred embodiments of the invention explained with reference to the accompanying drawings, in which:

FIG. 9 is a perspective view of yet another embodiment of the optical detection section;

FIG. 10 shows a sensor array and ejector valves; and

PREFERRED EMBODIMENTS OF THE INVENTION

Figure 1:
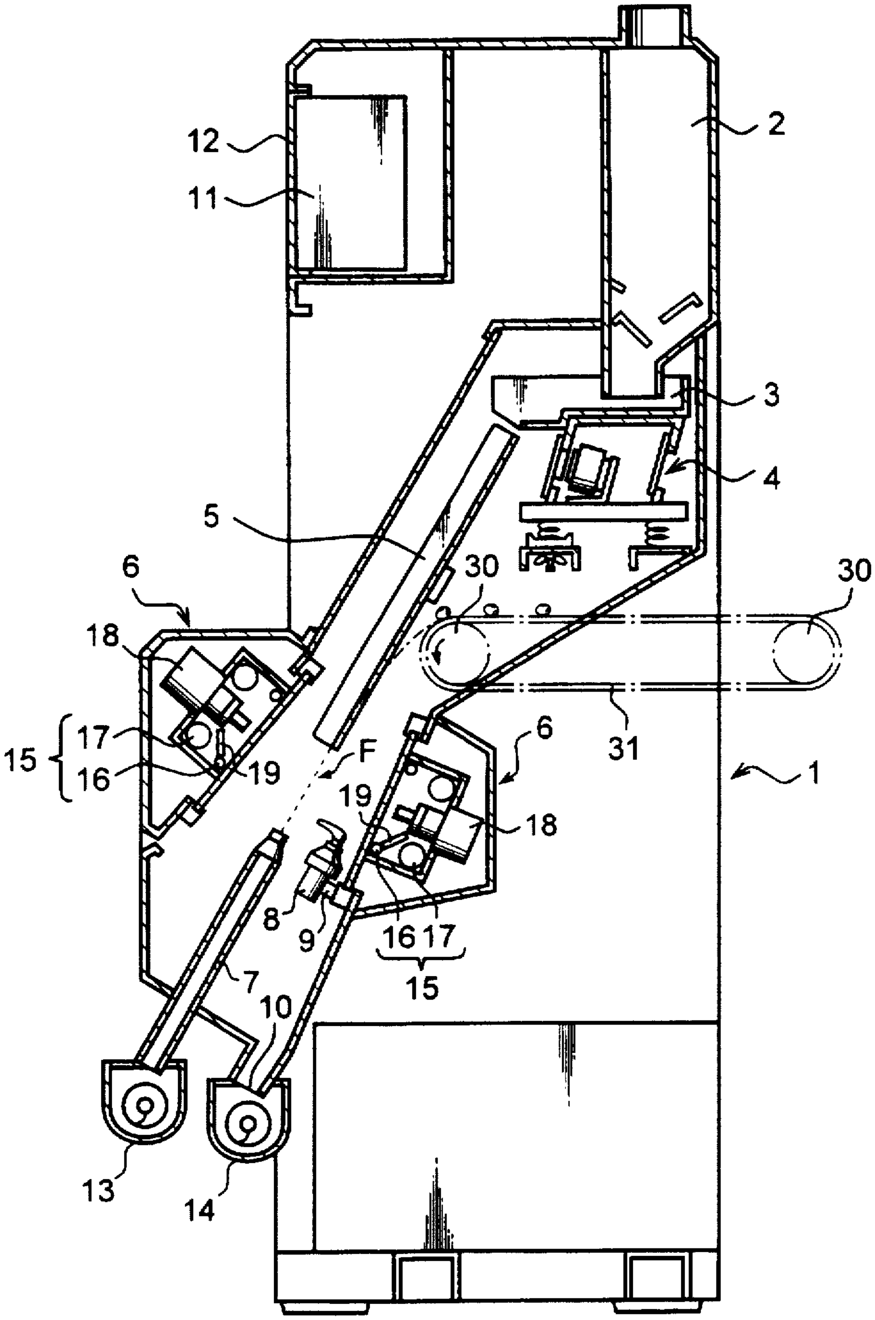
FIG. 1 is a side sectional view of a grain color sorting apparatus according to the present invention.

Now, with reference to the accompanying drawings, preferred embodiments of the present invention will be described by taking an example of sorting the grains of rice as the grain. Referring to FIG. 1, a raw material tank 2 is provided at the upper side portion within a frame 1. On the lower end of the raw material tank 2, there is mounted a vibrating feeder trough 3 which is mounted on a vibration generator 4 consisting of a vibrator and the like. The vibrating feeder trough 3 is connected to a chute 5 which is arranged with inclination. The upper end of the chute 5 with a V-shaped cross section is disposed adjacent to an end of a trough of the vibrating feeder trough 3, while its lower end is positioned between a pair of optical detection means 6. Below the chute 5, a cylindrical receiving trough 7 is mounted for receiving the particulate grain falling from the lower end of the chute 5. Conveyor means 13 is connected to the lower end of the receiving trough 7 for discharging the products outside the machine. A nozzle of an ejector valve 8 is disposed near a detection field F in the path from the lower end of the chute 5 to the receiving trough 7 for rejecting particles with different color or foreign materials from the grain falling through the detection field F. The ejector valve 8 is connected to an air compressor (not shown) through an air pipe 9. A rejective product discharge port 10 is provided below the ejector valve 8. Conveyor means 14 is coupled to the rejective product discharge port 10 for discharging the rejective products outside the machine. A control box 11 and an operation panel 12 are located at the top portion of the frame 1.

Figure 2:
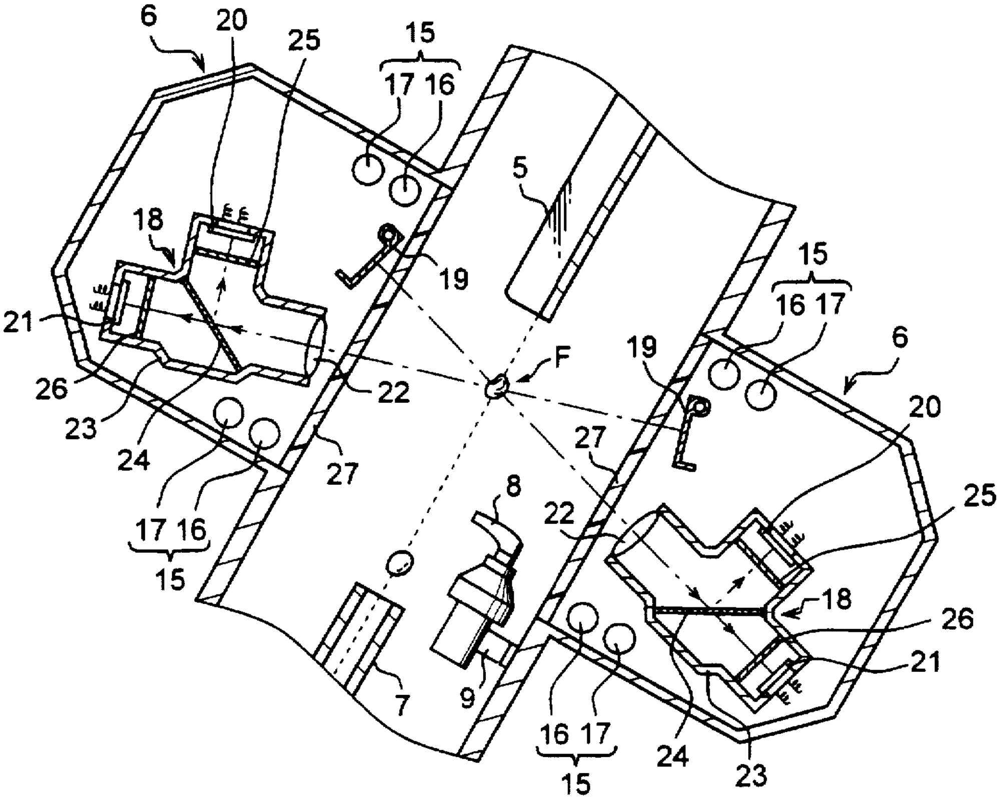
FIG. 2 is an enlarged view of an essential section of the grain color sorting apparatus.

Now, an embodiment of illumination means 15 and the optical detection means 6 are described referring to FIG. 2. The illumination means 15 is disposed near the optical detection means 6 so as to illuminate the grains falling through the predetermined detection field F. The illumination means 15 employs a single light source or several light sources having spectral energy distribution in the visible light region and the near infrared region. In the embodiment, a plurality sets of a fluorescent tube 16 with the visible light region and a halogen lamp 17 with the near infrared region are provided to surround the detection field F.

Figure 3:
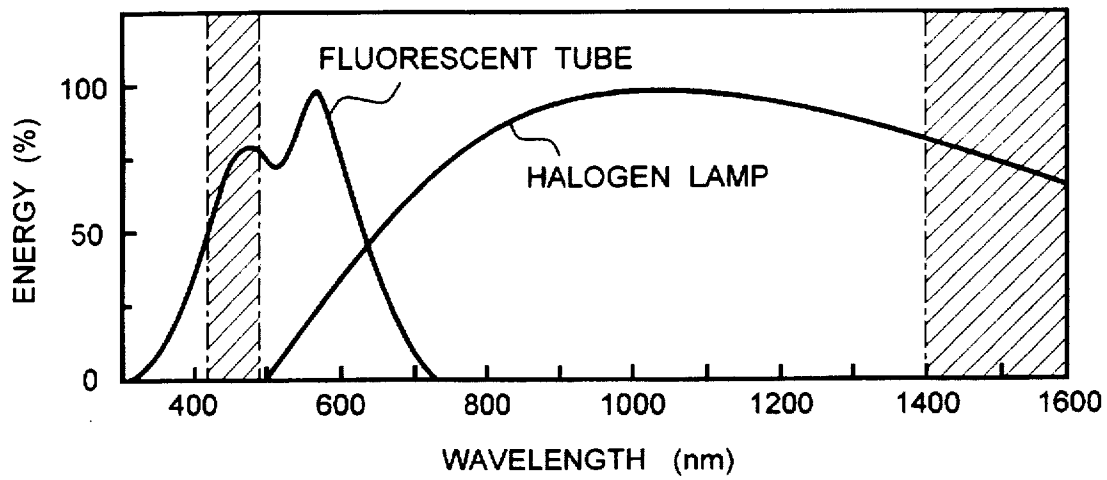
FIG. 3 is a spectral energy distribution graph of the illumination means.
Figure 4:
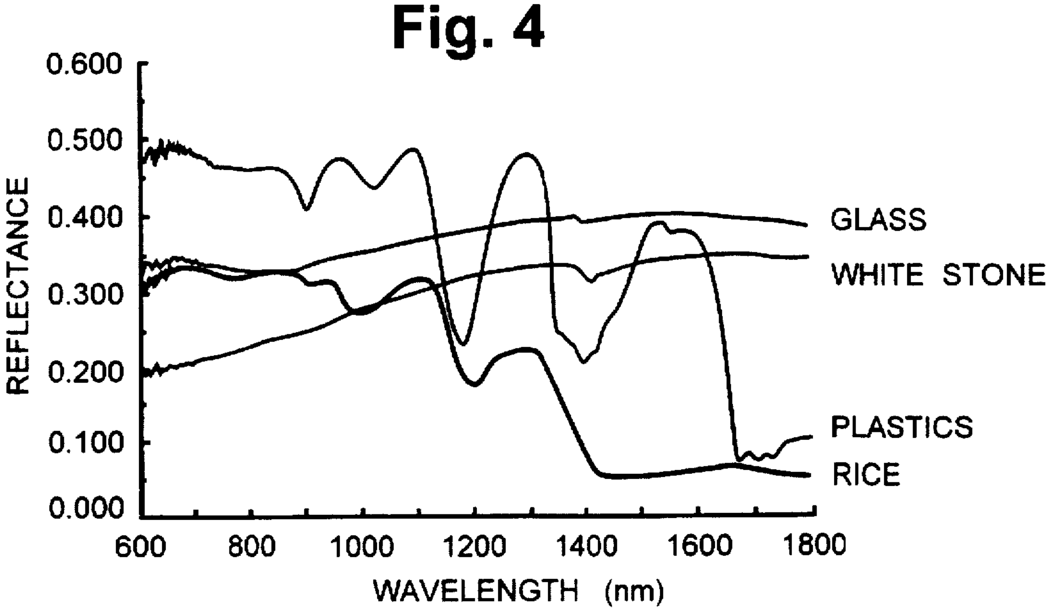
FIG. 4 is a graph showing the reflected light characteristics in the near infrared region of polished rice, pieces of glass, pieces of plastics, and a white stone.

The optical detection means 6 consists of an optical detection section 18 for receiving the light from the illuminated grain and a background 19 provided at a position opposite to the optical detection section 18 with the detection field F interposed therebetween. In the embodiment, two sets of the optical detection means 6 are provided so that both the front and the rear of the grain can be simultaneously monitored. The optical detection section 18 of the optical detection means 6 is composed of a silicon photosensor 20 with high sensitivity to the visible light region and a germanium photosensor 21 with high sensitivity to the near infrared region, which are placed in a lens tube 23 with a condenser lens 22 placed therein. A dichroic mirror 24 is mounted with inclination at the center of the lens tube 24. An optical filter 26 suitable for the near infrared region is placed between the dichroic mirror 24 and the germanium photosensor 21, while an optical filter 25 suitable for the visible light region is placed between the dichroic mirror 24 and the silicon photosensor 20. The optical filter 25 suitable for the visible light region is sufficient if it is capable of distinguishing between a light grain from a dark grain, and suitably selected from those with, for example, a wavelength range of 420–490 nm as shown in FIG. 3. On the other hand, the optical filter 26 for the near infrared range is for identifying or distinguishing foreign materials which are difficult to be identified by the visible light region, and selected from those with, for example, a wavelength range of 1400–1600 nm as shown in FIG. 3.

Figure 7:
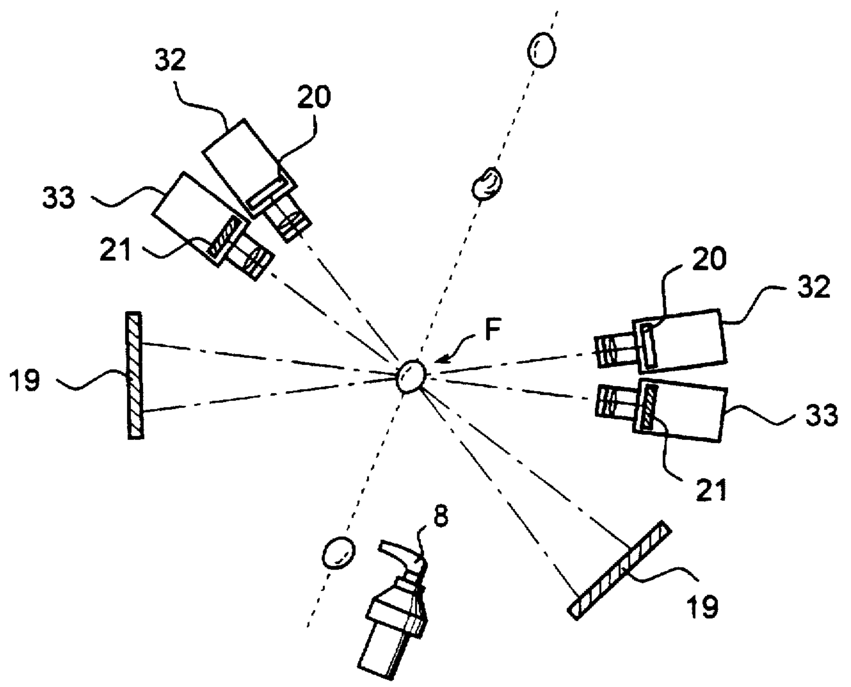
FIG. 7 shows another embodiment of the optical detection section.
Figure 8:
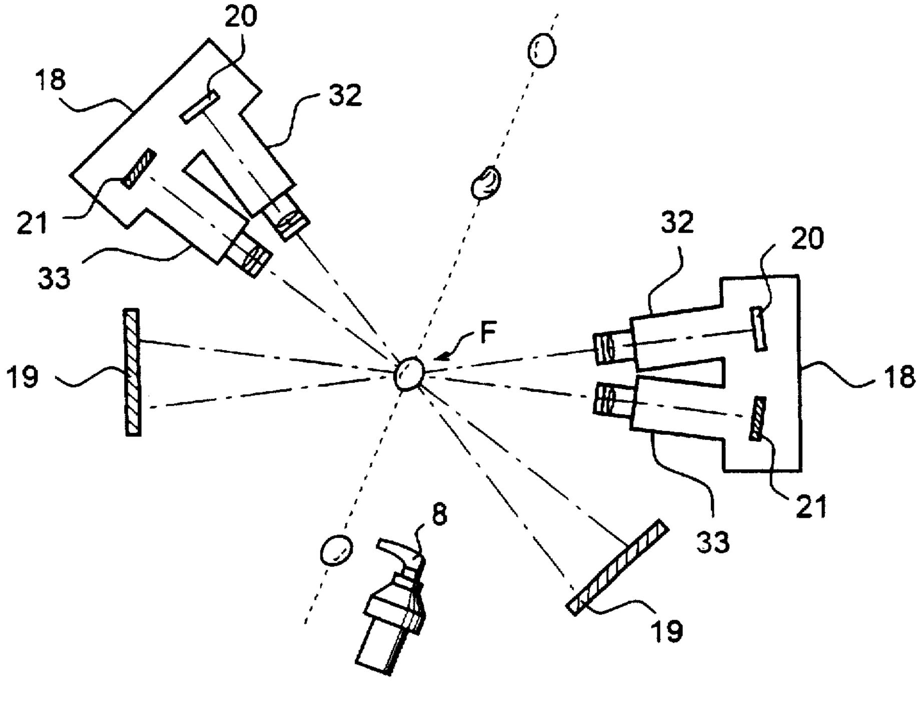
FIG. 8 shows still another embodiment of the optical detection section.

In the case where the dichroic mirror 24 is not arranged in the lens tube 23, it is sufficient if two sets of the lens tube 32 for the silicon photosensor 20 and the lens tube 33 for the germanium photosensor 21 are arranged vertically or horizontally side by side as shown in FIG. 7. It is also sufficient if two lens tubes 32 and 33 each accommodating therein the silicon photosensor 20 and the germanium photosensor 21 are arranged in parallel as shown in FIG. 8.

The background 19 is positioned opposite to the optical detection section 18 with the detection field F positioned therebetween, and is formed by a glass plate or the like with a white surface. The illumination means 15 is arranged near the background 19 so that it continuously illuminates the background 19. The background 19 is so arranged that the amount of light received from the illumination means 15 can be varied by changing its inclination angle.

Transparent glass plates 27, 27 are arranged on the opposite surfaces of the respective optical detection means 6, 6 to prevent entering of dirt. The transparent glass plates 27, 27 may include cleaning means (not shown) causing a slider to reciprocate.

Figure 5:
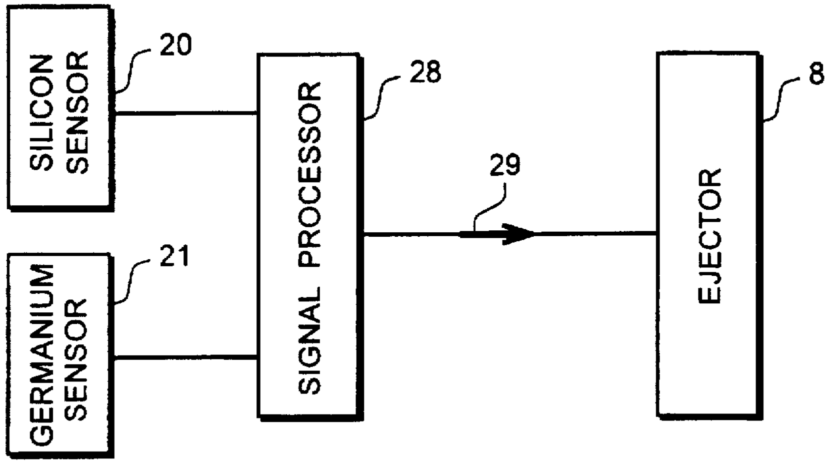
FIG. 5 is a block diagram illustrating a control circuit of the present invention.

FIG. 5 shows a block diagram illustrating a control circuit of the present apparatus. The received light signals from the silicon photosensor 20 and the germanium photosensor 21 are input into signal processing means 28 consisting of an OR gate, an amplifier, a comparator and an arithmetic operation circuit. A rejection signal 29 output from the signal processing means 28 is fed to the ejector valve 8 which ejects air from the nozzle to sort the grain with different color and foreign materials.

Now, the operation of the above arrangement will be described by referring to FIGS. 1, 2 and 6. The grain is fed into the raw material tank 2 from a chute pipe of a bucket elevator (not shown) by turning on a switch provided on the operation panel 12. Now, when the vibrating feeder trough 3 is driven, the grain falling from the trough to the chute 5, sequentially slides down on the trough floor of the chute 5, and are transferred to the detection field F from the lower end of the chute 5.

The grain to be sorted fed to the detection field F is illuminated by the illumination means 15 consisting of the fluorescent tube 16 and the halogen lamp 17. The reflected light and the transmitted light from the grain to be sorted are directed to the dichroic mirror 24 through the condenser lens 22 in the lens tube 23. The dichroic mirror 24 has characteristics such that it transmits a longer wavelength region than the wavelength of 590 nm as a boundary through the dichroic mirror surface, and reflects a shorter wavelength region. That is, the reflected light from the grain to be sorted that is illuminated by the fluorescent tube 16 (wavelength region of 350–700 nm) is reflected by the dichroic mirror 24 and received by the silicon photosensor 20, while the reflected light from the grain to be sorted that is illuminated by the halogen lamp 17 (wavelength region of 500–2000 nm) transmits the dichroic mirror 24 and is received by the germanium photosensor 21.

The silicon photosensor 20 and the germanium photosensor 21 also continuously monitor the background 19 the brightness of which has been adjusted in advance so as to be equal to the acceptable products (polished rice). FIG. 6 shows output waveforms of the sensors 20 and 21, and the rejection signal 29. The waveform of the silicon photosensor 20 causes less variation in the signal when the acceptable products (polished rice) pass through the detection field F, but larger variation when particles to be sorted such as colored particles or dark stone identifiable in the visible light region pass through the field so that the difference of brightness can be sensed ((20) in FIG. 6).

Even if there is no change in the detected signal of the silicon photosensor 20, there is a possibility that foreign materials (for example, pieces of glass, plastics, white stones) having the same color as the acceptable ones or transparency are mixed in the materials to be sorted. The waveform of the germanium photosensor 21 causes less variation in the signal when the acceptable products (polished rice) pass through the detection field F, but larger variation when particles to be sorted such as pieces of glass, plastics, white stones identifiable in the near infrared region pass through the detection field so that the difference of brightness can be sensed ((21) in FIG. 6).

Figure 6:
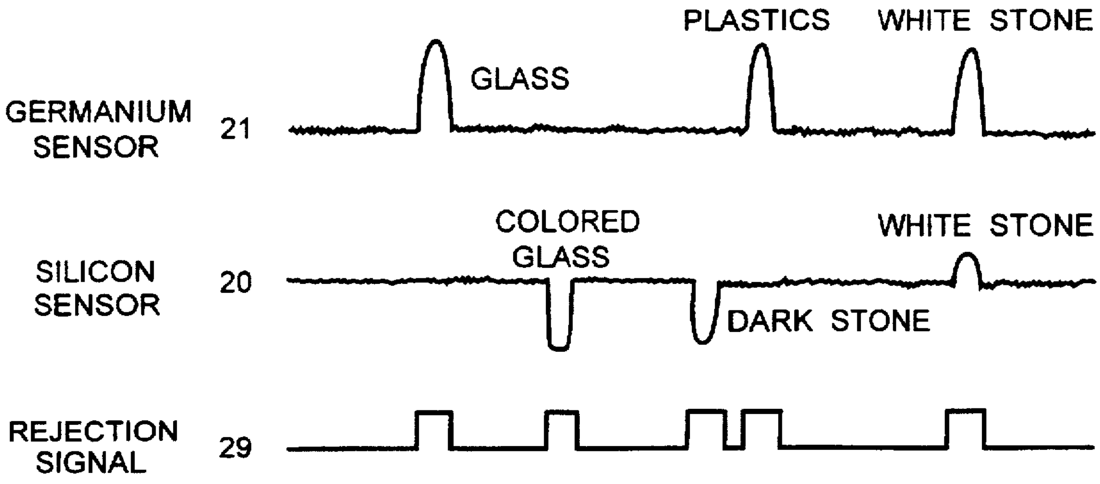
FIG. 6 are graphs showing output waveforms in each arrangement of the apparatus according to the present invention.

Output signals of the silicon photosensor 20 and the germanium photosensor 21 are input into the signal processing means 28 which sequentially performs amplification, comparison and arithmetic processing, and outputs the rejection signal 29 ((29) in FIG. 6). The ejector valve 8 is actuated in response to the rejection signal 29, and ejects compressed air through the nozzle. The compressed air blows off different colored grain or foreign materials with the same color as the acceptable products or transparency from the acceptable products (polished rice) for sorting. The blown-off different colored grain and foreign materials are transferred to the conveyor means 14 through the rejective product discharge port 10 and discharged out from the machine.

The acceptable products (polished rice) which do not generate the rejection signal even if they pass through the detection field F are transferred to the receiving trough 7, and discharged out of the machine by the conveyor means 13 as the good products.

Although, in the above embodiment, the dichroic mirror 24 is mounted in the optical detection section 18 of the optical detection means 6, this arrangement is not desirable in practical use because it makes the inner structure of the optical detection section 18 complicated, and results in higher manufacturing cost. Then, the optical detection section 18 shown in FIG. 9 is so arranged that a plurality of silicon photosensors 20 with high sensitivity to the visible light region and a plurality of germanium photosensors 21 with high sensitivity to the near infrared region are arranged in a single lens tube 23 in a row, the light receiving sensors 20 and 21 in the row being vertically arranged in parallel and integrated in the direction of the grain flow. The optical detection means 18 is constituted, for example, by arranging fifteen silicon photosensors 20 (15 elements) and fifteen germanium photosensors 21 (15 elements) in the single lens tube 23 to form a sensor array 20A and a sensor array 21A, the sensor arrays 20A and 21A being vertically arranged in parallel and integrated.

The illumination means 15 is located near the optical detection means 18, the illuminating means 15 being for illuminating the grain falling through the grain flowing-down path F, and consisting of the fluorescent tube 16 and the halogen lamp 17. A background 19A for the sensor array 20A and a background 19B for the sensor array 21A are disposed at a position opposite to the optical detection section 18 with the grain flowing-down path F interposed therebetween. Moreover, an optical filter suitable for the visible light region (not shown) is provided for the sensor array 20A, while an optical filter with high sensitivity to the near infrared region (not shown) is provided for the sensor array 21A.

Furthermore, a plurality of ejector valves are mounted in correspondence to the respective sensor arrays 20A and 21A below the optical detection section 18. FIG. 10 is a diagram showing the sensor arrays 20A and 21A mounted in the lens tube 23, and a plurality of ejector valves. Five sets of the respective sensor arrays 20A and 21A each set of which consists of three elements are provided in a row. Five ejector valves E1–E5 are provided in correspondence to the five sets of sensor arrays. In other words, the sensor arrays A1–A5 correspond to the ejector valves E1–E5, respectively. Now, if one of the three elements in the sensor array A1 detects an abnormal condition as rejective grain or foreign materials flowing down the grain flowing-down path F, the ejector valve E1 is actuated to reject the rejective grain or foreign materials. That is, with this arrangement, since the grain flowing-down path F is monitored by a number of sensors, and a plurality of ejector valves are provided accordingly, erroneous sorting does not occur even if the particles to be sorted are continuously fed to the grain flowing-down path F so that sorting can be attained at a high accuracy.

Figure 11:
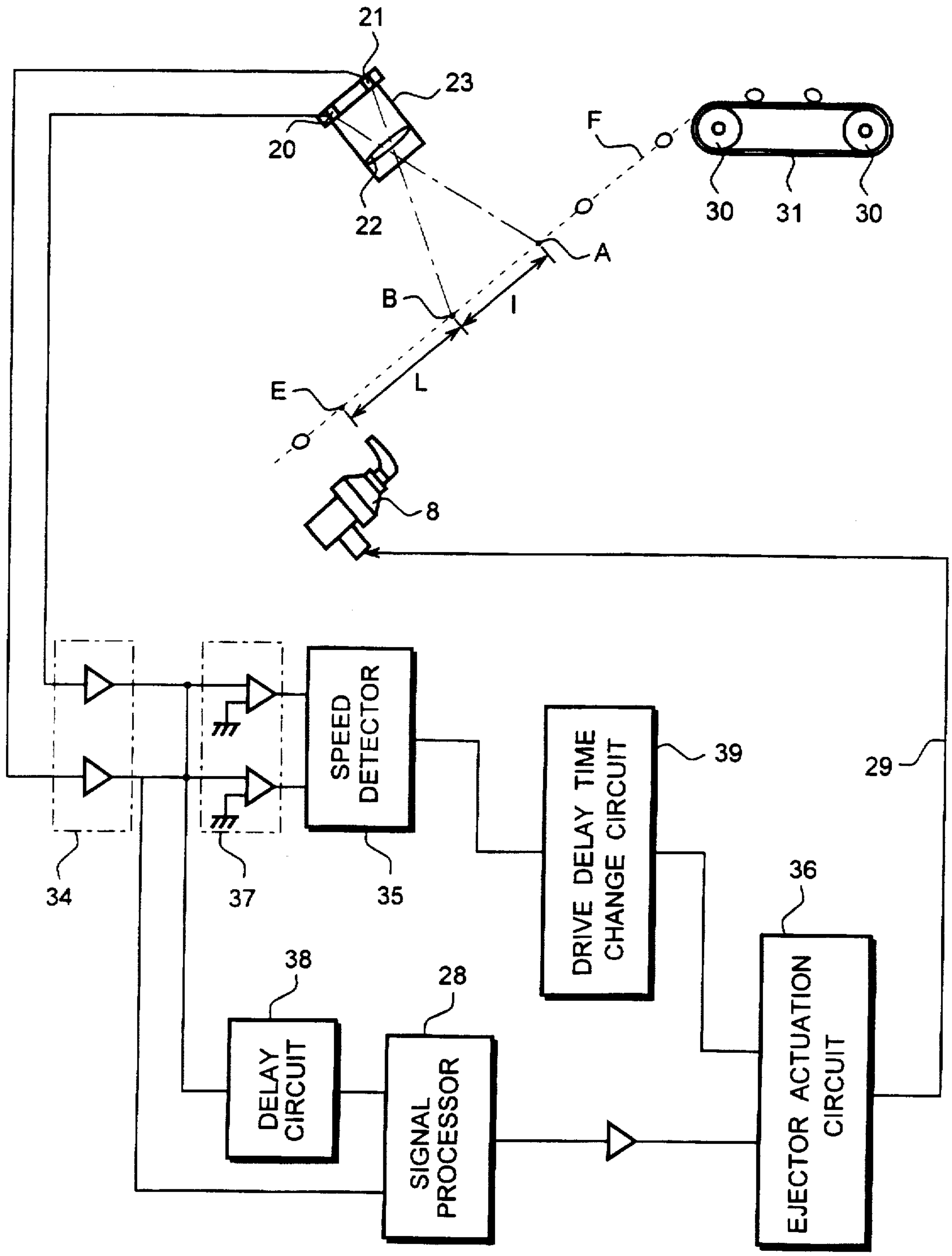
FIG. 11 is a block diagram illustrating the control circuit of the present invention.

FIG. 11 is a block diagram showing the control circuit of the present apparatus in the above arrangement. The received light signals from the silicon photosensor 20 and the germanium photosensor 21 are input into amplifiers 34. An output of each of the amplifiers 34 is branched to a path connecting to an ejector actuation circuit 36 through a grain detection circuit 37 and a speed detection circuit 35, and a path connecting to the ejector actuation circuit 36 through the signal processing means 28. The rejection signal 29 output from the ejector actuation circuit 36 is input into the ejector valve 8 which in turn ejects air from the nozzle to sort the different colored grain or foreign materials.

Now, the operation of the above arrangement will be described by referring to FIGS. 9 and 11. When the grain is transferred by the grain guide means consisting of a conveyor belt 31 extending between a pair of rollers 30, 30, the grain flows down along the grain flowing-down path F, and first falls to a light receiving position A of the silicon photosensor 20.

The particles fed to the light receiving position A are illuminated by the illumination means 15 consisting of the fluorescent tube 16 and the halogen lamp 17. The amount of reflected light from the particles is compared with the amount of reflected light from the background 19A, and received by the silicon photosensor 20.

Then, the particle to be sorted further flows down the grain flowing-down path F, and reaches a light receiving position B of the germanium photosensor 21. The particle to be sorted fed to the light receiving position B is illuminated by the illumination means 15 in a manner similar to the above. The amount of reflected light from the particles is compared with the amount of reflected light from a background 19B, and received by the germanium photosensor 21.

The signals detected by the silicon photosensor 20 and the germanium photosensor 21 are amplified by the amplifiers 34, and branched at the amplifiers 34 so as to follow two different paths, one path connecting to the ejector actuation circuit 36 through the grain detection circuit 37 and the speed detection circuit 35, and the other path connecting to the ejector actuation circuit 36 through the signal processing means 28. Here, the processing by the speed detection circuit 35 will be described.

As shown in FIG. 11, established on the grain flowing-down path F are the light receiving positions A and B of both light receiving sensors 20 and 21, respectively, and the ejection position E of the ejector valve 8. The light receiving positions A and B are separated by a predetermined distance I. Thus, the flowing speed of the grain can be calculated by dividing the distance I with the time from a timing when the grain is sensed at the position A to a timing when it is sensed at the position B. In addition, the drive delay time of the ejector valve 8 is the time from a timing when the grain passes the position B to a timing when it reaches the ejection position E, and can be calculated by dividing a distance L between the light receiving position B and the ejection position E with the flowing speed calculated as explained above.

The flowing speed of the grain is calculated by the grain detection circuit 37 and the speed detection circuit 35 with the above-mentioned processing. Although the flowing speed of the grain is usually constant, it may be varied by frictional resistance of the grain guide means or air resistance. In such case, the speed detection circuit 35 outputs a signal to a drive delay time change circuit 39, which in turn calculates the drive delay time for the ejector suitable for the flowing speed of the grain. Then, the drive delay time is input into the ejector actuation circuit 36.

Reference numeral 38 designates an analog or digital delay circuit which delays the sensing signal of the silicon photosensor 20 so that it is simultaneously input to the signal processing means 28 together with the sensing signal of the germanium photosensor 21. The signal processing means 28 detects the different colored grain or foreign materials with the same color as the acceptable products or transparency from the sensing signals from both sensors 20 and 21, and inputs an abnormal condition detection signal to the ejector actuation circuit 36.

The ejector actuation circuit 36 receives the signals from the signal processing means 28 and the drive delay time change circuit 39, and generates the rejection signal 29. The rejection signal 29 actuates the ejector valve 8 at a delay time suitable for the flowing speed of the grain to eject air from the nozzle. The sorting of grain is performed by blowing off the different colored grain or foreign materials from the acceptable products.

Since, according to the grain color sorting apparatus of the present invention, a single light source or a plurality of light sources with spectral energy distribution in the visible light region and the near infrared region are employed as the illumination means for illuminating the grain while it flows down into the predetermined detection field along the grain path, at least a set of optical detection means is provided for detecting the predetermined detection field, and the optical detection section of the optical detection means consists of the light receiving sensor with high sensitivity to the visible light region and the light receiving sensor with high sensitivity to the near infrared region, the visible rays and the near infrared rays are simultaneously illuminated on the grain passing through the detection field, and the amount of reflected light obtained from illumination of the visible rays and the amount of reflected light obtained from illumination of the near infrared rays are received by the individual light receiving sensors with high sensitivity to the respective wavelength regions, whereby a single color sorting apparatus can sort and reject foreign materials with color different from that of the acceptable products in the visible light region, and also can sort and reject foreign materials with the same color as the acceptable product or transparency.

In addition, because a dichroic mirror is mounted in the optical detection section of the optical detection means for dividing the reflected light obtained by irradiating the grain falling through the detection field with the rays from the light source into a component with longer wavelength and a component with shorter wavelength, the light receiving sensor with high sensitivity to the visible light region and the light receiving sensor with high sensitivity to the near infrared region can be mounted in a single lens tube so that the apparatus can be simplified, reduced in its size, and manufactured at lower cost.

Moreover, the optical detection means may be arranged by a plurality of light receiving sensors with high sensitivity to the visible light region and a plurality of light receiving sensors with high sensitivity to the near infrared region in a row, respectively, the respective light receiving sensors in the rows being integrally formed by vertically arranging them in parallel, whereby the apparatus can be more simplified, reduced in its size, and manufactured at lower cost than the one using the dichroic mirror.

Furthermore, a plurality of ejector means are provided in a row in correspondence to the light receiving sensors in a row, whereby erroneous sorting does not occur even if the articles to be sorted are continuously fed to the grain flowing-down path so that sorting can be attained at a high accuracy.

Furthermore, since the control circuit is provided with the speed detection circuit which detects the flowing speed of the grain when it passes the light receiving position of the light receiving sensor with high sensitivity to the visible light and the light receiving position of the light receiving sensor with high sensitivity to the near infrared region by receiving the sensing signals from both the sensors, and the drive delay time change circuit which changes drive delay time of the ejector means when there has occurred a change in the flowing speed of the grain detected by the speed detection circuit, whereby erroneous sorting does not occur even if the flowing speed of the grain is varied by frictional resistance of the grain guide means or air resistance.

The grain guide means may be a plurality of chutes disposed with inclination, or a conveyor belt extending between a pair of rollers so that not only grains but also beans can be sorted and rejected.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A grain color sorting apparatus comprising:

grain guide means for guiding grain along a predetermined grain path;

grain feeding means for feeding grain to said grain guide means;

optical detection means having illumination means for illuminating the grain at a predetermined detection field while the grain flows down along the grain path, an optical detection section for receiving light from said illuminated grain, and a background disposed at a location opposite to said optical detection section with said grain path interposed therebetween, said illumination means including at least one kind of light source having spectral energy distribution in both a visible light region and a near infrared region, at least one set of said optical detection means formed by said optical detection section and said background being provided, and said optical detection section being integrally formed by a first light receiving sensor with high sensitivity to the visible light region and a second light receiving sensor with high sensitivity to the near infrared region, said first light receiving sensor being directed to a first viewing point within said predetermined detection field and said second light receiving sensor being directed to a second viewing point which is different from said first viewing point within said predetermined detection field;

a control circuit for outputting a rejection signal by comparing an output signal of said optical detection means with a threshold value, said control circuit comprising a speed detection circuit for detecting a flowing speed of the grain based on a time difference between the detection of a given grain by said first light receiving sensor and the detection of the same grain by said second light receiving sensor, and a drive delay time change circuit for changing a drive delay time of said elector means when there has occurred a change in the flowing speed of the grain detected by said speed detection circuit; and ejector means disposed below said optical detection means and arranged for rejecting rejective grain or foreign materials according to the rejection signal from said control circuit.

2. A grain color sorting apparatus according to claim 1, wherein said first light receiving sensor having high sensitivity to the visible light region includes a silicon photosensor and said second light receiving sensor having high sensitivity to the near infrared region includes a germanium photosensor.

3. A grain color sorting apparatus according to claim 1, wherein said optical detection section is provided with a plurality of said first light receiving sensors with high sensitivity to said visible light region and a plurality of said second light receiving sensors with high sensitivity to said near infrared region in respective rows, said respective first and second light receiving sensors in the respective rows being integrally formed by arranging them in parallel with a predetermined displacement being provided in a moving direction of the grains; and wherein a plurality of said ejector means are provided in a row in correspondence to said first and second light receiving sensors in rows.

* * * * *